(12) United States Patent
Kaneyama et al.

(10) Patent No.: US 6,430,327 B1
(45) Date of Patent: Aug. 6, 2002

(54) OPTICAL MODULE AND MANUFACTURING METHOD THEREOF

(75) Inventors: Yoshinobu Kaneyama; Masataka Ito; Masahiko Fujiwara; Sakae Kitajo; Mikio Oda; Yuzo Shimada, all of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/602,092

(22) Filed: Jun. 22, 2000

(30) Foreign Application Priority Data

Jun. 23, 1999 (JP) .............................. 11-177094

(51) Int. Cl.[7] ................................................. G02B 6/12
(52) U.S. Cl. .............................. 385/14; 385/88; 385/92; 385/94
(58) Field of Search ........................... 385/88, 89, 90, 385/91, 92, 93, 94, 14

(56) References Cited

U.S. PATENT DOCUMENTS 5,818,990 A * 10/1998 Steijer ........................ 385/49
6,019,523 A * 2/2000 Honmou ..................... 385/94

FOREIGN PATENT DOCUMENTS

| JP | 3-76197 | 2/1991 | ............ H05K/5/03 |
| JP | 9-61676 | 7/1997 | ............ G02B/6/42 |
| JP | 9-236731 | 9/1997 | ............ G02B/6/42 |
| JP | 236731/1997 A1 * | 9/1997 | ............ G02B/6/42 |
| JP | 10-209426 | 7/1998 | ............ H01L/27/15 |

* cited by examiner

Primary Examiner—Brian Healy
Assistant Examiner—Kevin S Wood
(74) Attorney, Agent, or Firm—Hayes Soloway P.C.

(57) ABSTRACT

After an optical element 6, and more preferably both an optical element 6 and an electrical element 7, are mounted on a substrate 1, an upper clad 5 of optical waveguide is formed, covering these elements, and thereby a structure of hermetic seal is achieved through the use of the upper clad 5.

14 Claims, 4 Drawing Sheets

OPTICAL MODULE AND MANUFACTURING METHOD THEREOF

BACKGROUND OF THE INVENTION

1. Field of the Invention

The present invention relates to an optical module and more particularly to a substrate structure in which an optical element, an optical waveguide and an electrical element are all present. Further, the present invention relates to a manufacturing method thereof.

2. Description of the Related Art

A substrate wherein an optical element, an optical waveguide and an electrical element are all present, has, hitherto, a structure in which an optical waveguide is formed on a multi-layered ceramic substrate and, thereon, an optical element and an electrical element are mounted, as described, for example, in Japanese Patent Application Laid-open No. 236731/1997. In such a structure, however, both the optical element and the electrical element are directly exposed to the air so that the optical element and the electrical element are liable to be degraded under the influence of oxygen and moisture in the air. Therefore, for practical application, this structure by itself is insufficient, and there is required an additional arrangement to cut off the air from this substrate, such as enclosing the substrate in a package with hermetic seal or the like. In this instance, a package structure must be designed in such a way that the optical signal and the electrical signal can be brought out from the package structure without affecting the airtightness therein. This complicates the structure and increases in number of components and steps for assembly and, thus, causes a disadvantage of high cost.

To overcome this, for example, in Japanese Patent Application Laid-open No. 61676/1997, there is disclosed a method in which, on the surface of a substrate where an optical waveguide is formed, two recess sections are formed and an optical element and an electrical element are mounted therein, respectively, and, by covering them with a lid and fixing the lid with resin, the optical element and the electrical element are isolated from the air. Further, another method to isolate an optical element and an electrical element from the air is also disclosed therein. In this method, instead of using a lid, recess sections on which the optical element and the electrical element are mounted are filled up with epoxy resin. Referring to FIGS. 4(a) and 4(b), this method is disclosed below. FIG. 4(a) is a plan view and FIG. 4(b) is a cross-sectional view, taken on line A–A' of FIG. 4(a), of a substrate into which an optical element and an electrical element are incorporated. As shown in FIGS. 4(a) and 4(b), a lower clad 3 of optical waveguide, cores 4 of optical waveguide and an upper clad 5 of optical waveguide are formed on a substrate 1. In the upper clad 5 of optical waveguide, two recess sections 8 are formed by means of microfabrication.

Within one recess section 8, an optical element 6 is fixed, being aligned precisely to the position of the cores 4 of optical waveguide, and, within the other recess section 8, the electrical element is mounted. The electrical connection between the optical element 6 and the electrical element 7 is made by connecting electrodes 11 on which the optical element 6 is placed to terminals 12 of the electrical element 7 with bonding wires 10. The inside of these recess sections 8 where the optical element 6 and the electrical element 7 are mounted is filled up with epoxy resin 9, and thereby the elements are isolated form the air.

However, the above methods, in which recess sections are formed on the substrate surface and an optical element and an electrical element are mounted therein, and then either a lid is laid thereon or the inside of the recess sections is filled up with resin, have the following problems.

Firstly, minute recess sections capable of containing an optical element or an electrical element must be formed on the substrate surface. In order to form such recess sections, microfabrication technology is necessary and, in consequence, the steps of fabrication process becomes complicated and the production cost increases.

Secondly, the optical element and the electrical element must be mounted within minute recess sections. Especially, for mounting of the optical element, a precision better than 1 μm with respect to the position of the optical waveguide is required. Such a high-precision mounting is a very difficult task to perform within a minute recess section and, in order to carry out that, costly mounting apparatus with a specifically designed mechanism is needed.

Thirdly, a step of making a structure to isolate the optical element and the electrical element from the air and a member for that step become necessary. That is to say, in the method wherein the optical element and the electrical element within recess sections in the substrate are covered with a lid., steps of placing the lid thereon and fixing the lid with resin are additionally required and the lid and the resin for fixing the lid are additionally required members for them. On the other hand, in the method wherein the inside of the recess sections in the substrate where the optical element and the electrical element are mounted is filled up with epoxy resin, steps of applying the epoxy resin thereto and hardening the epoxy resin are additionally required and the epoxy resin is an additionally required member. Such an additional requirement of any step and member directly leads to an increase in production cost.

SUMMARY OF THE INVENTION

A principle object of the present invention is to provide, for a substrate on which an optical element and an optical waveguide are disposed with their positions aligned precisely, a structure to isolate, at least, the optical element from the air, with low cost.

The present invention relates to an optical module wherein a substrate on which an optical waveguide is formed and, at least, an optical element is mounted, has a structure in which an upper clad of optical waveguide covers the optical element completely and thereby cuts off the air therefrom.

Further, the present invention relates to a method of manufacturing an optical module having a substrate on which an optical waveguide is formed and, at least, an optical element is mounted; which comprises steps of forming a lower clad and a core of optical waveguide on the substrate, mounting the optical element on the substrate so as to align an optical axis thereof to the core, and, forming an upper clad of optical waveguide to cover the optical element completely.

In this manner, as shown in FIG. 1, the upper clad 5 of polymer optical waveguide covers the surface of the optical element 6 and, if required, that of the electrical element 7 so that the optical element 6 and the electrical element 7 do not come into contact with the air, which produces the effect of protecting both elements from degradation by oxygen or moisture in the air.

Further, in the manufacturing steps of the present invention, the surfaces of the optical element 6 and the electrical element 7 can be covered, simultaneously with the formation of the upper clad of optical waveguide, without requiring any special extra step or member to isolate the optical element 6 and the electrical element 7 from the air. This simplifies the steps and members, and produces another effect of lowering production cost.

The present invention successfully achieves the isolation of, at least, an optical element from the air, on the basis of a standard arrangement in which, simultaneously with the formation of an upper clad of polymer optical waveguide, at least, an optical element and preferably both an optical element and an electrical element are covered with the upper clad of optical waveguide. Therefore, in order to isolate an element from the air, no special extra manufacturing steps or members are required and, thus, production cost can be reduced.

In the present invention, especially since mounting of the optical element in which high precision is required for making alignment with the optical waveguide is performed prior to the formation of the upper clad of optical waveguide, the formation of minute recess sections on the upper clad becomes unnecessary. Moreover, because mounting within such a minute recess section is not needed any more, alignment with a high precision can be more easily achieved than in the conventional method.

DETAILED DESCRIPTION OF THE PREFERRED EMBODIMENTS

Figure 1:
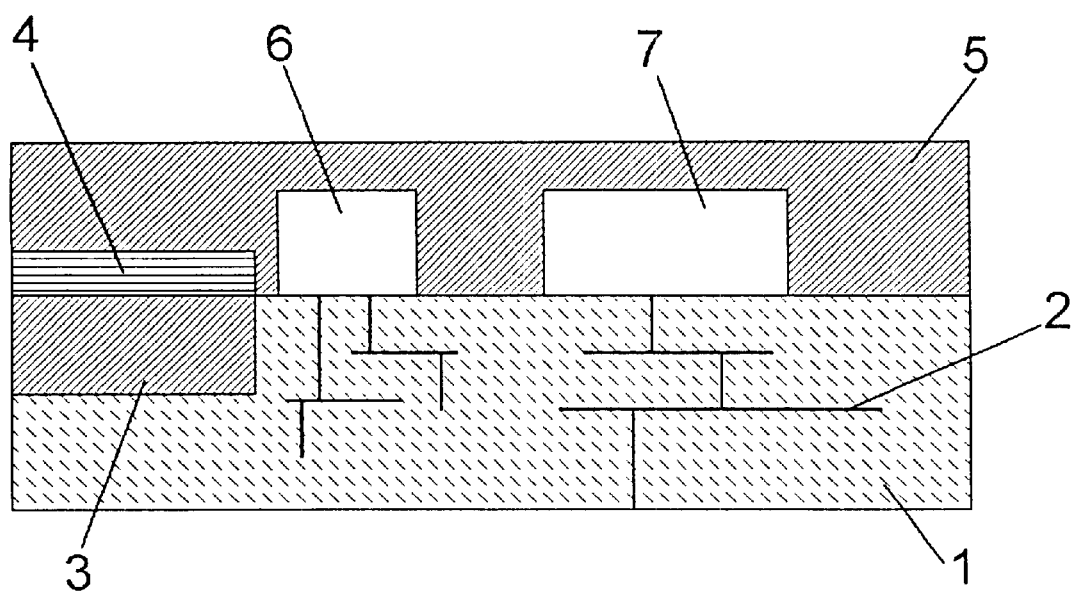
FIG. 1 is a cross-sectional view showing an optoelectrically incorporated module that is an embodiment of the present invention.

Next, referring to the drawings, the embodiments of the present invention are described in detail.

FIG. 1 is a cross-sectional view of an embodiment of the present invention. On the surface of a ceramic substrate 1 having electrical wirings 2 inside, an optical element 6 and an electrical element 7 are mounted, and a lower clad 3 of polymer optical waveguide, a core 4 of polymer optical waveguide and an upper clad 5 of polymer optical waveguide are formed. The core 4 of polymer optical waveguide and the optical element 6 are aligned in such a way that their optical axes coincide.

Next, referring to FIGS. 2(a) to 2(e), a manufacturing method of the present invention is described below.

Figure 2A:
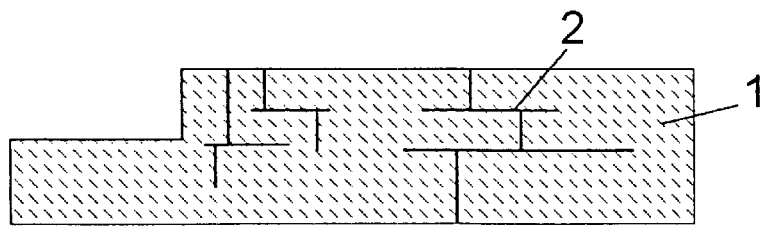
FIGS. 2(a) to 2(e) are cross-sectional views illustrating the steps of a method of manufacturing the optoelectrically incorporated module shown in FIG. 1.
Figure 2B:
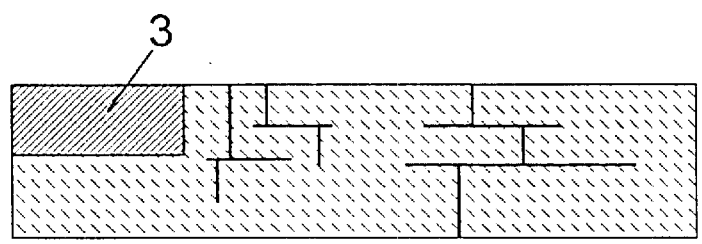
Figure 2C:
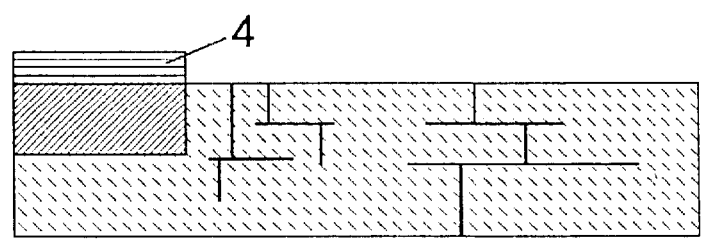
Figure 2D:
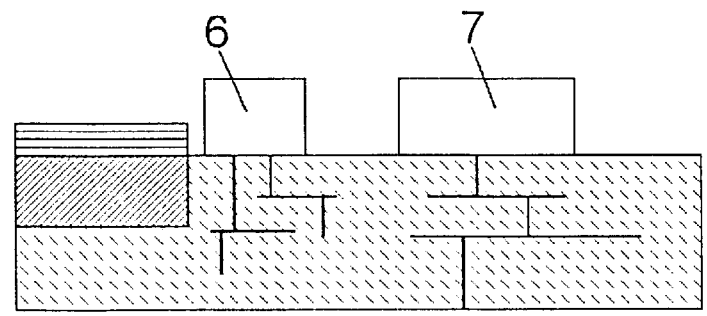
Figure 2E:
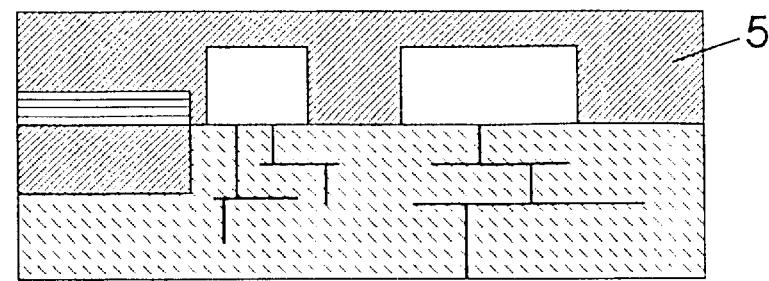

First, as shown in FIG. 2(a), a ceramic substrate 1 having electrical wirings 2 inside is formed. Further, a section in which a lower clad of optical waveguide is to be formed is formed into shape, thereat, by means of etching or the like. Next, this substrate surface is spin-coated with a polymer material for optical waveguide such as fluorine-substituted polyimide, and, then, by means of photolithography, dry etching is applied thereto except a section where a core of polymer optical waveguide is to be formed in order to remove the superfluous section of the polymer material for optical waveguide, and thereby a lower clad 3 of optical waveguide is formed (FIG. 2(b)). Subsequently, a spin-coating of another polymer material of optical waveguide that has a slightly higher refractive index than the first polymer material is applied thereto and, again, by removing the superfluous section thereof through photolithography and dry etching, a core 4 of polymer optical waveguide is fabricated (FIG. 2(c)). After that, an optical element 6 is mounted so as to align an optical axis thereof to the core 4 of polymer optical waveguide and then an electrical element 7 is also mounted thereon (FIG. 2(d)). Finally, the entire surface of the substrate is spin-coated with a polymer material for optical waveguide other than the one used for the core, thick enough to cover the optical element 6 and the electrical element 7 completely, and thereby an upper clad 5 of polymer optical waveguide is fabricated, accomplishing the whole fabrication (FIG. 2(e)).

In the present invention, fabrication of the upper clad 5 of polymer optical waveguide and hermetic sealing of the optical element 6 and the electrical element 7 are carried out simultaneously, using the same member, as described above, so that the manufacturing steps are simplified, with the number of the steps and a variety of used members being reduced, and the effect of lowering production cost is achieved.

In the above example, the structure described is the one wherein, on a substrate into which an optical element and an electrical element are incorporated, both of the elements are covered with an upper clad of optical waveguide. However, the structure of the present invention is not limited to this one and may be the one wherein, at least, an optical element is covered with an upper clad. Further, the substrate is not limited to the above-mentioned ceramic substrate having electrical wirings inside, either, and the present invention may be applicable to a Si substrate on which only an optical waveguide and an optical element are placed, or the like. With respect to the material for the optical waveguide, it is not limited to fluorine-substituted polyimide described in the above example, but known polymer materials, for instance, polymethyl methacrylate (PMMA), siloxane-based polymer or the like, can be utilized. Alternatively, even using an inorganic material of waveguide, similar effect can be obtained by carrying out fabrication at a relatively low temperature, for example, employing the SOG (Spin On Glass) method or the like.

Figure 3:
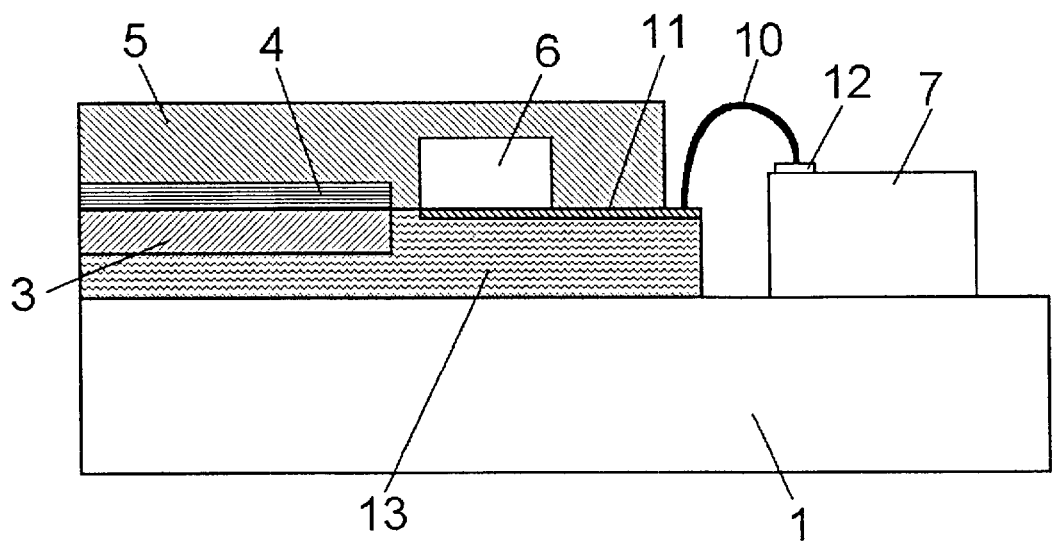
FIG. 3 is a cross-sectional view showing an optoelectrically incorporated module that is another embodiment of the present invention.
Figure 4A:
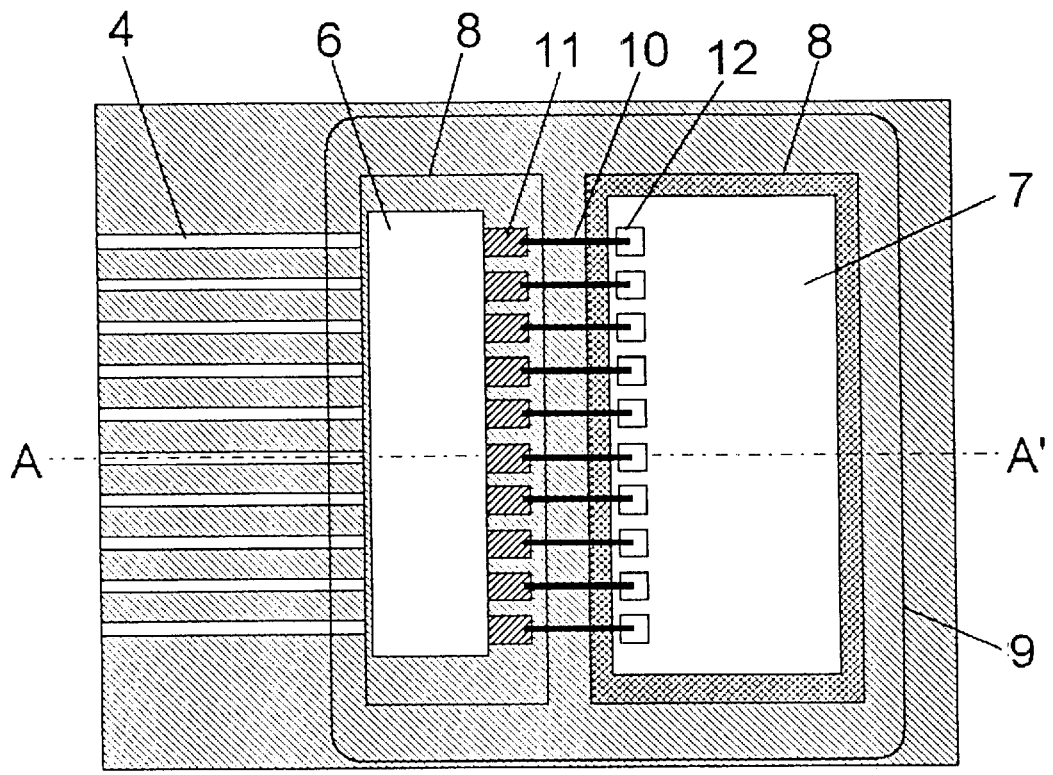
FIG. 4(a) is a plan view and FIG. 4(b) is a cross-sectional view of a conventional optoelectrically incorporated module.
Figure 4B:
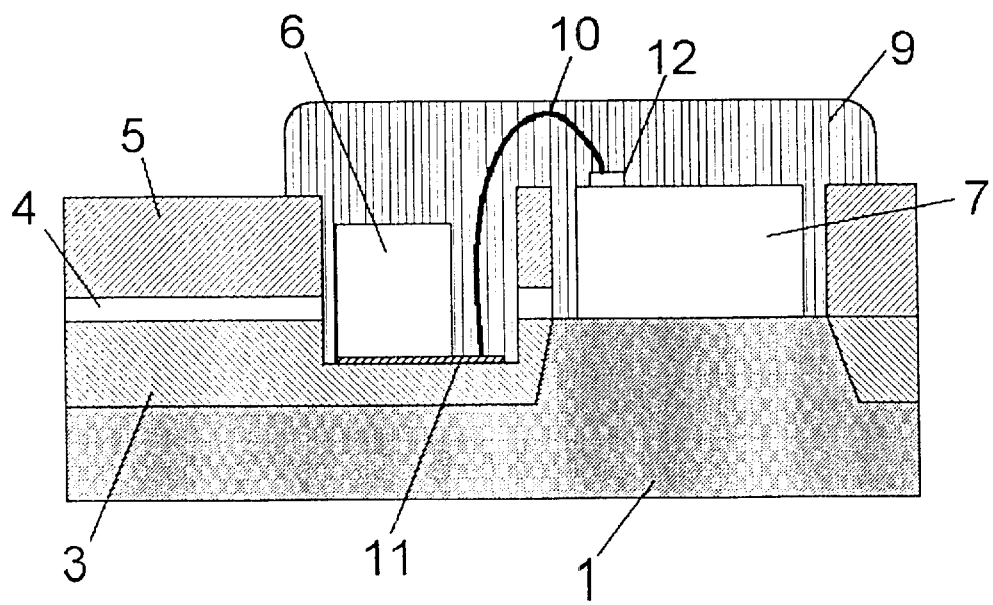

FIG. 3 is a cross-sectional view showing the second embodiment of the present invention. FIG. 3 represents a structure in which an optical waveguide and an optical element 6 alone are mounted on a Si substrate 13 and said Si substrate 13 is placed on a substrate 1 on which an electrical element 7 is mounted. After the optical element 6 is mounted on the Si substrate 13 so as to align an optical axis thereof to a core 4 of an optical waveguide, an upper clad 5 of optical waveguide is formed to cover the optical element 6 completely. The electrical connection to the optical element is made by an arrangement in which an electrode layer 11 is formed beneath the optical element 6, and an exposed part of the electrode layer 11 lying at the end section of the Si substrate 13 is connected to a terminal 12 of the electrical element 7 with a bonding wire 10. A structure of this sort is possible in the case that hermetic seal is not particularly necessary for the electrical element, for example, when a packaged electrical element is utilized, and is capable to provide hermetic seal, at least, to the optical element with low cost.

What is claimed is:

1. An optical module comprising a substrate within having a recess in which a lower clad of an optical guide is formed, a core of an optical waveguide is formed on the lower clad, and, an optical element is mounted on the substrate with its optical axis aligned with the optical axis of the optical waveguide, wherein an upper clad of the optical waveguide covers the optical element completely and thereby cuts off the air therefrom.

2. The optical module according to claim 1, wherein said upper clad is made of a resin material.

3. The optical module according to claim 2, wherein said resin material is fluorine-substituted polyimide.

4. The optical module according to claim 1, wherein an electrical element is placed on the substrate where said optical element is mounted so that the substrate is made an optoelectrically incorporated substrate.

5. The optical module according to claim 4, which has a structure in which the upper clad of optical waveguide covers said electrical element, together with the optical element, and thereby cuts off the air therefrom.

6. The optical module according to claim 1, wherein said substrate on which, at least, said optical element is mounted is a ceramic substrate.

7. The optical module according to claim 6, wherein said ceramic substrate being formed multi-layered has a multi-layered wiring inside.

8. A method of manufacturing an optical module having a substrate on which an optical waveguide is formed and, at least, an optical element is mounted; which comprises steps of forming a lower clad within a recess in the substrate and a core of optical waveguide on the lower clad, mounting the optical element on the substrate so as to align an optical axis thereof to an optical axis of the core, and, forming an upper clad of optical waveguide to cover the optical element completely.

9. The method of manufacturing an optical module according to claim 8, wherein said upper clad is made of a resin material.

10. The method of manufacturing an optical module according to claim 9, wherein said resin material is fluorine-substituted polyimide.

11. The method of manufacturing an optical module according to claim 8, wherein an electrical element is placed on the substrate where said optical element is mounted so that the substrate is made an optoelectrically incorporated substrate.

12. The method of manufacturing an optical module according to claim 11, wherein the upper clad of optical waveguide covers said electrical element, together with the optical element.

13. The method of manufacturing an optical module according to claim 8, wherein said substrate on which, at least, said optical element is mounted is a ceramic substrate.

14. The method of manufacturing an optical module according to claim 13, wherein said ceramic substrate being formed multi-layered has a multi-layered wiring inside.

* * * * *